United States Patent [19]

Donegan et al.

[11] Patent Number: 4,859,770

[45] Date of Patent: Aug. 22, 1989

[54] PROCESS FOR MAKING ALPHA-PHASE PHTHALOCYANINE BLUE PIGMENT COMPRISING SUBSTANTIALLY 100 PERCENT ISOMETRIC CRYSTALS

[75] Inventors: Thomas E. Donegan, Holland; Timothy G. Leary, Grand Haven, both of Mich.; Arvind S. Patil, Williamsburg, Va.

[73] Assignee: BASF Corporation, Parsippany, N.J.

[21] Appl. No.: 145,400

[22] Filed: Jan. 19, 1988

[51] Int. Cl.$^4$ .............................................. C09B 47/04
[52] U.S. Cl. ................................... 540/136; 540/140; 540/141
[58] Field of Search ..................... 540/136, 140, 141

[56] References Cited

U.S. PATENT DOCUMENTS

| 3,051,720 | 8/1962 | Minnich | 540/141 X |
| 3,775,149 | 11/1973 | Langley et al. | 540/141 X |
| 3,984,433 | 10/1976 | Spietschka et al. | 540/132 |
| 4,104,277 | 8/1978 | Langley | 540/141 |
| 4,158,572 | 6/1979 | Blackburn et al. | 106/412 |
| 4,224,222 | 9/1980 | Spietschka et al. | 540/141 |
| 4,257,951 | 3/1981 | Matrick | 540/141 |
| 4,289,698 | 9/1981 | Stepp | 540/141 X |

FOREIGN PATENT DOCUMENTS 1096192 12/1967 United Kingdom.

Primary Examiner—Richard L. Raymond
Attorney, Agent, or Firm—Rupert B. Hurley, Jr.

[57] ABSTRACT

Alpha-phase phthalocyanine pigment crystals are produced as substantially 100 percent isometric crystals by first activating a phthalocyanine pigment crude, followed by combining the activated crude with water and a surfactant, whereby a mixture is formed. The mixture is then milled so that a pigment slurry is formed.

20 Claims, No Drawings

PROCESS FOR MAKING ALPHA-PHASE PHTHALOCYANINE BLUE PIGMENT COMPRISING SUBSTANTIALLY 100 PERCENT ISOMETRIC CRYSTALS

FIELD OF THE INVENTION

The present invention pertains to the field of pigments, and further to phthalocyanine pigments. More particularly, the present invention involves a method of making α-phase phthalocyanine blue pigment crystals which are substantially 100 percent isometric crystals.

DESCRIPTION OF THE PRIOR ART

The closest art of which the inventors are aware is: U.S. Pat. Nos. 4,158,572; 3,775,149; British patent No. 1,096,192; U.S. Pat. Nos. 4,224,222; 3,984,433; 4,257,951; 4,104,277; 4,289,698; 3,051,720. Each of these patents is discussed below. This discussion focuses on both the gist of each of these issued patents as well as how each patent differs from the process of present invention.

U.S. Pat. No. 4,158,572 (the '572 patent) discloses a method of making a pure β-phase phthalocyanine pigment. Although the method of the '572 patent is similar to the process of the present invention, the '572 patent differs from the present invention in the following ways: (1) the initial dry grinding operation of the '572 patent produces a mixture of the α- and β-crystal forms, whereas the activation step of the present invention produces substantially 100 percent of the α-crystal form; (2) in the '572 patent, the stirring of the ground intermediate with the aqueous solution of surfactant converts the remaining α-phase phthalocyanine to β-phase phthalocyanine, whereas in the process of the present invention stirring the β-phase phthalocyanine with the aqueous solution of surfactant does not convert any of the α-phase phthalocyanine to β-phase phthalocyanine; (3) the '572 patent isolates a β-phase phthalocyanine, while in the process of the present invention an α-phase phthalocyanine is isolated.

U.S. Pat. No. 3,775,149 (the '149 patent) discloses a method for making a phthalocyanine pigment which is at least 80 percent β-phthalocyanine. The method is very similar to the method described in the '572 patent (discussed above) in that the '149 process utilizes no organic solvent but rather uses an aqueous surfactant solution during the grinding step. In contrast to the '149 patent, the process of the present invention produces an α-phase phthalocyanine that is in the isometric crystal form.

U.S. Pat. No. 4,224,222 (the '222 patent) discloses a method for preparing a copper phthalocyanine pigment of the α-phase. The method of the '222 patent utilizes an aqueous solution containing ". . . 2 to 10 percent by weight of an aliphatic or cycloaliphatic alcohol having 3 to 6 carbon atoms." (col 4, ll. 9–11 of the '222 patent). Furthermore, the '222 patent nowhere mentions the use of surfactants. In contrast, the process of the present invention utilizes no organic solvents, and in addition the process of the present invention requires the use of a surfactant in the milling step.

U.S. Pat. No. 3,984,433 (the '433 patent) discloses a process for making phthalocyanine pigments of the α-modification wherein a phthalocyanine crude is first dissolved in an acid and is then precipitated, following which the precipitated product is ground in the presence of water in order to form a pigmentary phthalocyanine crude. In contrast, the process of the present invention subjects the phthalocyanine crude to a milling operation (i.e. activation) in order to form the α-phase, following which the activated crude is subjected to milling in the presence of both water and a surfactant.

U.S. Pat. No. 4,257,951 (the '951 patent) discloses a two-step milling process for preparing pigmentary copper phthalocyanine. The milling process utilizes both an aluminum salt and an organic solvent in both the first grinding step and the second grinding step, followed by treating the milled product with an organic liquid in water emulsion. The product of this process is a β-phase copper phthalocyanine pigment. The '951 patent also states that "If the solvent is absent, the salt milling would invariably give the alpha phase product; but when such a solvent is present in sufficient quantity, the product is in the β-crystal phase." Column 1, lines 38–42. This process step is described as using salt and preferably at least a minimal amount of a phase-directing solvent as well as grinding elements such as "Cyl Pebs" (column 2, line 46). In contrast, the process of the present invention produces substantially 100 percent isometric, α-phase pigmentary copper phthalocyanine without the use of either an organic solvent or salt grinding.

U.S. Pat. No. 4,104,277 discloses a process for preparing an alpha or beta phase copper phthalocyanine pigment. The process utilizes a dry milling of crude copper phthalocyanine followed by mixing the crude with an emulsion comprising a liquid amine, water, and a surfactant. Examples 16–18 in the '277 patent result in a pigment product which is at least 90 percent α-phase phthalocyanine. Although the processes utilized in Examples 16–18 are similar to the process of the present invention, the processes described in Examples 16–18 differ from the process of the present invention in that the processes in Examples 16–18 utilize an organic solvent (diethylaniline) and an organic resin (hydrogenated wood resin) to make an emulsion which is mixed with a ground pigment crude and then stirred at high speed. In contrast, the process of the present invention utilizes organic solvents, and requires no organic resins.

U.S. Pat. Nos. 4,289,698 and 3,051,720 both pertain to solvent stable copper phthalocyanine blue pigments which are made by partially dissolving a phthalocyanine pigment in a concentrated acid (i.e. an "acid pasting" process). The '698 patent first mills a dry phthalocyanine crude in a ball mill, resulting in a predominantly α-phase ground phthalocyanine crude. The ground crude is then contacted with chlorine and afterwards is acid pasted, resulting in an α-phase phthalocyanine pigment. The '720 patent is similar to the '698 patent except that the process of the '720 patent does not contact the phthalocyanine with chlorine. Rather, the process of the present invention requires only water and a surfactant, and produces a substantially 100 percent β-phase, isometric phthalocyanine pigment.

BRIEF SUMMARY OF THE INVENTION

The present invention pertains to a process for making a substantially 100 percent isometric, α-phase phthalocyanine pigment. The process comprises the steps of:
 (a) activating a phthalocyanine crude whereby a substantially 100 percent α-phase activated crude is formed; and
 (b) combining the activated crude with:

(1) an amount of water which is effective to produce a millable mixture, and
(2) a surfactant which is effective to wet-out the activated crude, whereby a mixture is formed; and
(c) milling the mixture so that a pigment slurry is formed and so that the pigment within the slurry is comprised of substantially 100 percent isometric, α-phase phthalocyanine crystals.

The process of the present invention is advantageous over prior art processes in that no organic solvents or large amounts of concentrated acids are required. This reduces both the costs and the wastes produced in making the pigment product. The process of the invention is also advantageous in that the pigment product produced is of excellent quality. The pigment product is red in shade, clean, and strong, when compared with other commercially available, red shade phthalocyanine blue pigments produced by more expensive processes which create more environmental impact.

DETAILED DESCRIPTION OF THE PREFERRED EMBODIMENTS

Although the present invention pertains to phthalocyanine pigments, copper phthalocyanine is the most preferred of the phthalocyanine pigments. However, other metal phthalocyanine pigments (Co, Fe, Al, V, etc.) may be used. Furthermore, the phthalocyanine blue pigment of the present invention is either unchlorinated or monochlorinated.

As stated above, a major advantage in the present invention is that neither organic solvents nor large amounts of concentrated acid are required in the process of the present invention. Rather, the present invention requires that a phthalocyanine blue crude is activated and that the activated crude is then milled in the presence of water and a surfactant.

The activation step must be carried out by dry milling the crude in a ball mill for at least 24 hours. Most preferably "Cyl Pebs", or an equivalent, are utilized in the ball mill. Preferably the dry milling is carried out for at least 40 hours and most preferably for 48 hours. The activation step breaks down the crystal size and simultaneously forms agglomerates of small, isometric, α-phase, phthalocyanine blue crystals. The agglomeration of these crystals is eliminated in the subsequent milling step. The activation step also ensures that the crude is rendered substantially 100% α-phase. The present invention can be used to make a substantially 100% α-phase pigment from a phthalocyanine blue pigment crude. In order to ensure that substantially 100% α-phase crystals are present after activation, the activation step should be carried out for at least 24 hours, and preferably for at least 40 hours. Of course, if the crystals making up the phthalocyanine blue crude are already substantially 100% α-phase, the activation step may be shortened, but it remains necessary to carry out the activation step for a long enough period to break the particle size down to within the desired size range, which is at least small enough to be considered pigmentary. The α-phase crystals produced by the activation step are isometric. Isometric crystals have an aspect ratio of approximately 1. In other words, isometric crystals have a length, width, and thickness which are all substantially equal to one another.

The activation step is most preferably carried out by dry-milling the pigment crude.

After the activation step, the activated crude is combined with both (1) an amount of water effective to produce a millable mixture, and (2) a surfactant which is effective to produce a millable mixture most preferably comprising approximately 80 weight percent of the mixture.

The effective surfactant must cause the water to completely wet-out the activated crude. In other words, the combination of the water and the effective surfactant together causes each of the pigment crystals to be individually surrounded with water. Surfactants known to be effective are: organic polyphosphoric ester acid anhydride, dioctyl ester of sodium sulfosuccinic acid, dodecylbenzene sulfonic acid, and aminomethylpropylamine. Aerosol OT is the most preferred of these effective surfactants. Most preferably, the amount of the effective surfactant in the mixture comprises approximately 25 weight percent, based on pigment crude, of surfactant.

A mixture is formed by combining the activated crude with the water and the effective surfactant. The mixture is then milled so that a pigment slurry is formed. The milling step may be carried out using any of a wide variety of mills, including ball mills, Attritors, and Attritor-equivalents. Most preferably the mill used is an Attritor, and most preferably the media used in the ball mill is approximately 2 mm diameter stainless steel balls.

The milling operation deagglomerates the agglomerates of small (preferably 0.1 micron) α-phase phthalocyanine crystals produced by the activation step. After the milling step, the resulting pigment slurry is in a state of admixture with the milling medium. The media can be separated from the pigment slurry by filtering the slurry though a screen.

After separating the pigment slurry from the milling medium, the pigment is most preferably then isolated from the slurry as an aqueous presscake, and then dried. Preferably, this isolation is carried out with the following steps:
(1) diluting the slurry with water; and
(2) acidifying the diluted slurry to a pH between 1 and 2; and
(3) heating the acidified, diluted slurry to a temperature of 75° to 95° C.; and
(4) filtering the slurry whereby the pigment crystals are substantially separated from the liquid phase; and
(5) rinsing the pigment crystals with water to obtain an aqueous presscake.

Afterwards, the crystals may be dried in order to obtain a dry pigment toner.

EXAMPLE 1

A ball mill having a 2½ gallon capacity was charged with 33 pounds of steel media (Cyl Pebs). 906 Grams of chlorine-free crude copper phthalocyanine was then added to the ball mill. The mill was sealed and rotated for 48 hours at 70 percent of the critical speed. Although some heat was generated, the temperature inside the mill was not controlled. The activated crude powder was then discharged from the mill. The yield was 98 percent.

A laboratory Attritor containing 2 millimeter stainless steel (or chrome steel) balls was charged with 160 grams of water containing 12.8 grams of Aerosol-OT-75 ®, a surfactant. The mill was then agitated and 40 grams of the activated crude was added. The Attritor agitation rate was set at 520 rotations per minute, and the milling was continued for 150 minutes. After milling was complete, the milling media was isolated from the resulting pigment slurry by filtering the attritor contents through a screen. The isolated pigment slurry was then added to approximately 1 liter of water which contained enough hydrochloric acid to lower the pH of the pigment slurry to between 1 and 2. The pigment slurry was the heated (with steam) to 75° to 95° C. for 30 minutes, after which the slurry was then filtered, washed acid free, and dried.

The resulting pigment product was red in hue, very clean, and very strong when compared with a commercially available red shade phthalocyanine blue pigment in an oil ink.

During the milling process in the Attritor, the strength of the product was compared with a standard. The development of the strength was found to be as follows:

TABLE I

| Milling Time (minutes in Attritor) | No. parts product required to equal the strength of 100 parts of a Standard |
| --- | --- |
| 30 | 118 |
| 60 | 91 |
| 90 | 80 |
| 120 | 83 |
| 150 | 80 |

As can be seen in Table I, the product reached maximum strength in approximately 90 minutes.

Electron micrographs were taken of the product. The particles were approximately 0.1 microns in size compared to 0.2 to 1.0 microns for the standard. The particles also appeared isometric, in contrast to the standard, which was comprised of predominantly acicular crystals.

EXAMPLE 2

The process described in Example 1 was again carried out, except that the starting material was a mono-chlorinated copper phthalocyanine pigment crude (as opposed to the chlorine-free crude of Example 1). The product was non-crystallizing in solvents, and was strong, clean, and equal in hue to the product of Example 1. Again, the development of the strength was measured as a function of time, as follows:

TABLE II

| Milling Time (minutes in Attritor) | No. of Parts of Product Required to Equal the Strength of 100 Parts of Standard |
| --- | --- |
| 30 | 246 |
| 90 | 105 |
| 120 | 107 |
| 150 | 88 |

As can be seen in Table II, the mono-chlorinated phthalocyanine reached a strength substantially comparable to the strength of the standard in approximately 150 minutes.

EXAMPLE 3

The process of Example 1 was again carried out, except that in place of the chlorine-free phthalocyanine described in Example 1, a mixture of mono-chlorinated and chlorine-free copper phthalocyanine was processed.

We claim:
1. A process for making a substantially 100 percent isometric, α-phase phthalocyanine blue pigment, comprising:
   (a) activating a phthalocyanine blue pigment crude whereby an activated crude is formed,
   (b) combining the activated crude with:
      (1) an amount of water which is effective to produce a millable mixture,
      (2) a surfactant which is effective to wet-out the activated crude, whereby a mixture is formed, and
   (c) milling the mixture so that a pigment slurry is formed and so that the pigment within the slurry is comprised of substantially 100 percent isometric, α-phase phthalocyanine crystals.

2. A process as described in claim 1 wherein the substantially 100 percent isometric, α-phase phthalocyanine crystals in the pigment slurry are isolated from the slurry by:
   (1) diluting the slurry with water,
   (2) acidifying the diluted slurry to a pH between 1 and 2,
   (3) heating the acidified, diluted slurry to a temperature of 75° C. to 95° C.,
   (4) filtering the slurry whereby the pigment crystals are substantially separated from the liquid phase, and
   (5) rinsing the pigment crystals with water to obtain an aqueous presscake.

3. The process as described in claim 1 wherein the phthalocyanine is a copper phthalocyanine.

4. The process as described in claim 1 wherein the phthalocyanine is unchlorinated.

5. The process as described in claim 1 wherein the phthalocyanine is mono-chlorinated.

6. The process as described in claim 1 wherein the phthalocyanine is a mixture of unchlorinated and mono-chlorinated phthalocyanine.

7. The process as described in claim 1 wherein the activation is carried out by dry milling the phthalocyanine in a ball mill.

8. The process as described in claim 1 wherein the surfactant is selected from the group consisting of organic polyphosphoric ester acid anhydrides, dioctyl esters of sodium sulfosuccinic acid, dodecylbenzene sulfonic acid, and aminomethylpropylamine.

9. The process as described in claim 1 wherein the phthalocyanine blue pigment crude, which is subsequently activated, is predominantly comprised of the β-phase crystal form.

10. The process as described in claim 1 wherein the phthalocyanine blue pigment crude, which is subsequently activated, is predominantly comprised of the α-phase crystal form.

11. The process as described in claim 1 wherein the effective amount of water comprises approximately 80 weight percent of the mixture.

12. The process as described in claim 1 wherein the amount of the effective surfactant in the mixture comprises approximately 25 weight percent, based on pigment crude, of surfactant.

13. The process as described in claim 2 wherein the pigment crystals isolated in the presscake are dried so that a dry pigment toner is achieved.

14. A process as described in claim 3 wherein the copper phthalocyanine is mono-chlorinated.

15. A process as described in claim 7 wherein the phthalocyanine is a mono-chlorinated copper phthalocyanine.

16. A process as described in claim 15 wherein the activation is carried out by ball milling the pigment crude for at least 24 hours.

17. A process as described in claim 15 wherein the activation is carried out by ball milling the pigment crude for at least 40 hours.

18. A process as described in claim 15 wherein the activation is carried out by ball milling the crude for approximately 48 hours.

19. A process as described in claim 18 wherein the medium within the ball mill is Cyl-Pebs, or an equivalent.

20. A process as described in claim 19 wherein the surfactant is Aerosol OT.

* * * * *